Nov. 3, 1942.  J. W. ROBINS  2,300,810
PRESSURE RESPONSIVE INSTRUMENT
Filed June 26, 1941  3 Sheets-Sheet 1

Inventor
John W. Robins
By Roberts, Cushman & Woodberry
Att'ys.

Nov. 3, 1942.  J. W. ROBINS  2,300,810
PRESSURE RESPONSIVE INSTRUMENT
Filed June 26, 1941   3 Sheets-Sheet 2

Inventor
John W. Robins
By Roberts, Cushman & Woodberry
Attys.

Nov. 3, 1942.　　　　J. W. ROBINS　　　　2,300,810
PRESSURE RESPONSIVE INSTRUMENT
Filed June 26, 1941　　　　3 Sheets-Sheet 3

Inventor
John W. Robins
By Roberts Cushman & Woodbury
Att'ys.

Patented Nov. 3, 1942

2,300,810

UNITED STATES PATENT OFFICE 2,300,810

PRESSURE RESPONSIVE INSTRUMENT

John W. Robins, Fairfield, Conn., assignor to Manning, Maxwell & Moore, Incorporated, New York, N. Y., a corporation of New Jersey Application June 26, 1941, Serial No. 399,911

8 Claims. (Cl. 73—110)

This invention pertains to pressure-responsive instruments, for instance pressure gauges, dial thermometers, etc., and relates more particularly to an instrument so designed as to be substantially independent in its action of barometric changes, the embodiment here chosen for illustration being an absolute pressure gauge for measuring airplane engine manifold pressures. However, the invention is broadly applicable to other uses and is readily capable of embodiment in instruments designed for other specific purposes, for example in a differential pressure gauge.

For airplane use an instrument of this type must possess characteristics not necessarily required in an instrument of the same general kind employed for industrial purposes. Thus limitation of space in an airplane necessitates the use of an instrument of minimum dimensions; the wide variation in the angle of flight of an airplane makes it essential that any instrument employed must be substantially unaffected by its position in space; the shocks of landing and the vibrations of operation of the plane must not substantially affect the operation of the instrument and, since the safety of the plane and of its passengers may be entirely dependent upon the indications of the particular instrument, the latter must be extremely accurate and dependable under all conditions of use, including wide variations in temperature.

The present invention has for its principal object the provision of an instrument of the class described which, in respect to dimensions, durability and accuracy in any position in space, is acceptable for use in an airplane, and which during such use is substantially unaffected by the shocks and vibrations to which it may be subjected. A further object is to provide a manifold gauge for use with an airplane engine which is not responsive to changes in barometric pressure, and which is of great durability.

A further object is to provide a manifold gauge for use with airplane engines in which the movable parts and dial are exposed to the air rather than to gasoline vapor, and which can be depended upon to maintain a substantially uniform degree of sensitivity to pressure variations throughout a long period of use.

A further object is to provide a pressure gauge of that type wherein opposed pressure-responsive elements are employed for actuating a single pointer or index but wherein said elements are so designed and arranged that the instrument need not be of undue size for airplane use and in which the inaccuracies common to prior gauges employing opposed pressure-responsive elements are substantially eliminated.

A further object is to provide an instrument of the class described having a spring as one of its essential elements but so designed that not only is the spring modulus substantially unaffected by temperature changes but the accuracy of reading of the instrument is likewise substantially unaffected by differential expansion of the various constituent parts of the instrument.

Other and further objects and advantages of the invention may be pointed out in the following more detailed description and by reference to the accompanying drawings, wherein Fig. 1 is a fragmentary front elevation of a pressure gauge designed to indicate absolute pressures and embodying the present invention, portions of the case and dial being broken away to show the movement mechanism and the pressure-responsive elements;

Figure 1:
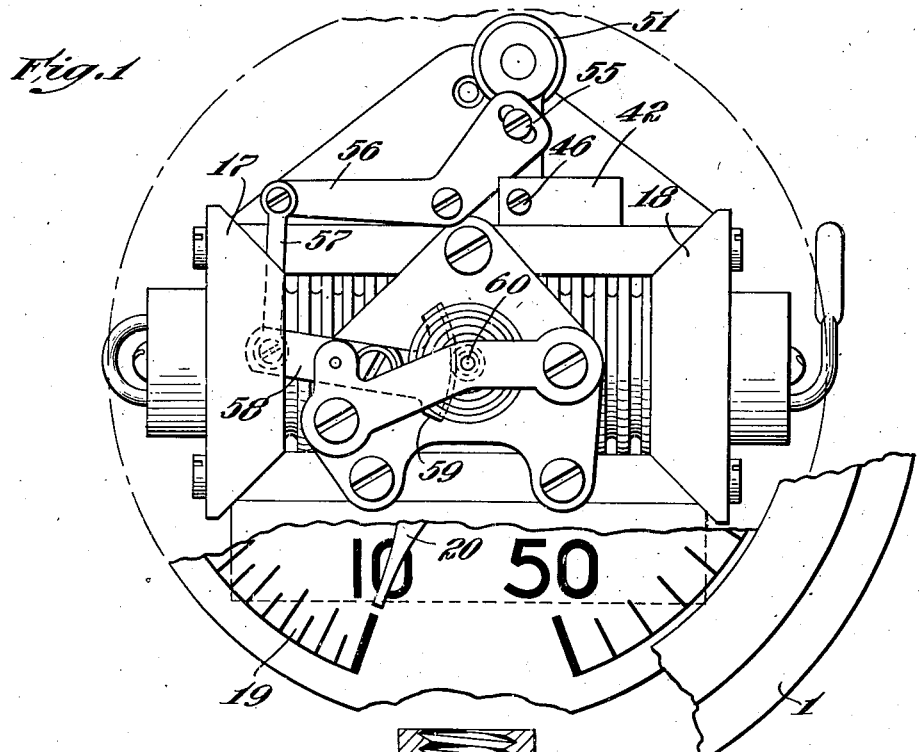

A majority of modern aircraft engines are now provided with supercharger apparatus in order to maintain the desired power output at high altitudes, the general practice being to supercharge the fuel-air mixture. Since the weight of the fuel which can be ignited at each stroke depends on the weight of air available, the power output at high altitudes can only be maintained by increasing the absolute pressure of the air delivered to the cylinders. Assuming that other factors remain constant, the weight of air per unit volume is directly proportional to its absolute pressure. Hence, for measuring the supercharger (i. e., manifold) pressure, it is necessary to employ an absolute pressure gauge since the ordinary pressure gauge indicates "gauge pressure," that is to say, the difference between the measured pressure and the external barometric pressure.

Certain prior types of manifold pressure gauges have employed an evacuated aneroid diaphragm capsule mounted within a sealed case. The manifold pressure is admitted to the inside of this sealed case and the resultant deflection of the capsule is transmitted to a suitable indicator by conventional gauge movement mechanism. While this prior construction is very simple, it has the disadvantage that the movement mechanism and dial are exposed to gasoline vapor and further that it is difficult to maintain the accuracy of operation of the parts over long periods of use. The mechanism of the present invention, as now to be described, avoids these previous disadvantages and provides an instrument which is accurate and dependable and which is not unduly complicated, while at the same time possessing further advantages hereinafter referred to not common to instruments of this type as previously commercialized.

Aircraft manifold pressure gauges are subjected during use to widely varying temperatures, and it is now the standard practice to specify that such instruments meet certain temperature tests. In general the specifications for temperature tests permit only a very small variation in calibration, when subjected to temperatures varying between —35 C. and +70 C., from the calibration of the instrument at room temperature.

The calibration errors which result from changes in temperature are in general of two types—first, those resultant from changes in the spring modulus (when a spring is employed as an element of the mechanism) and second, changes due to differential thermal expansion of materials employed in the instrument. In accordance with the present invention, errors in reading of the instrument by reason of temperature variation have been substantially eliminated.

Referring to the drawings, the numeral 1 designates a portion of the case of the instrument, such case being of any desired form and construction, although it is contemplated that for most purposes a case similar to that of the conventional pressure gauge will be employed. Such a case usually comprises a substantially cylindrical side wall and rear wall of pressed metal or the like and is provided with a removable front cap or cover having a transparent panel which protects the mechanism within the case and at the same time exposes the dial and indicator to view.

In accordance with the present invention, and as here illustrated, the improved instrument has a frame comprising the rear plate 2 (Figs. 3 and 4) which may be mounted within the gauge case in any desired manner, for example by the employment of screws or bolts by which it is attached to the inner surface of the rear wall of the case. This plate is provided with an opening which receives the inner or forward end of a plug 3 (Figs. 2 and 4) having an internally screw-threaded socket 4 designed to receive the end of a conduit which leads from the manifold of the engine. This plug may be secured to the plate 2 in any desired way, for example by screw threads, welding or the like. While as here shown this plug with its socket 4 is arranged at the rear of the apparatus, it is to be understood that it may be located in any other convenient place, for example so that the plug 3 may be extended through an opening in the side wall of the casing instead of through the rear wall as here provided for. The inner end of the socket 4 communicates with a chamber 5 (Fig. 2) within the plug 3 and from this chamber leads a lateral passage 6, the entrance to which may be controlled by an adjustable plug 7. The passage 6 is aligned with a canal 8 in a conduit 9, the end of the latter fitting within a socket in the plug 3 wherein it may be permanently secured by welding or other appropriate means.

Figure 2:
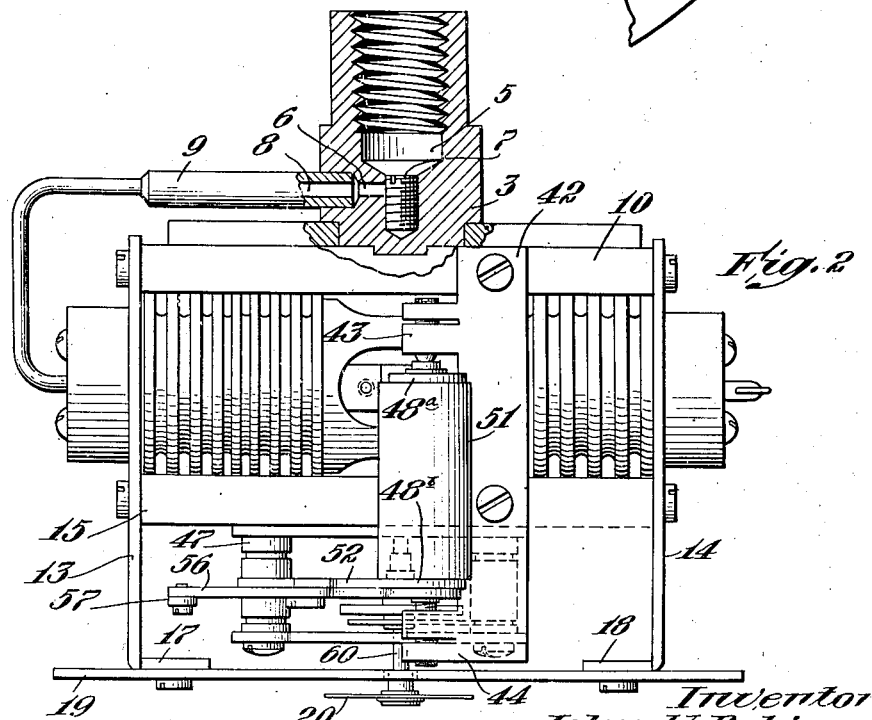
Fig. 2 is a plan view of the movement mechanism and pressure-responsive elements removed from the case, certain parts being in horizontal section.

The supporting frame of the instrument also comprises a pair of parallel substantially horizontal bars 10 and 11 (Fig. 4) spaced apart vertically and which may be secured to the plate 2 in any desired manner, for example by screws, bolts or welding. To the opposite ends of these bars 10 and 11 are secured forwardly extending, parallel plates 13 and 14 (Fig. 2). Spaced forwardly of the bars 10 and 11 and in the horizontal planes of these respective bars are two other bars 15 and 16 (Fig. 4) whose ends are secured to the plates 13 and 14 and which, with the bars 10 and 11, define a substantially rectangular, transversely elongate chamber for the reception of the pressure-responsive elements hereinafter described. The plates 13 and 14 extend forwardly of the bars 15 and 16 and are preferably provided with flanges 17 and 18 (Fig. 2) respectively at their forward ends, such flanges providing a suitable support to which the dial 19 is secured. This dial is suitably graduated for cooperation with the movable index or pointer 20.

Figure 3:
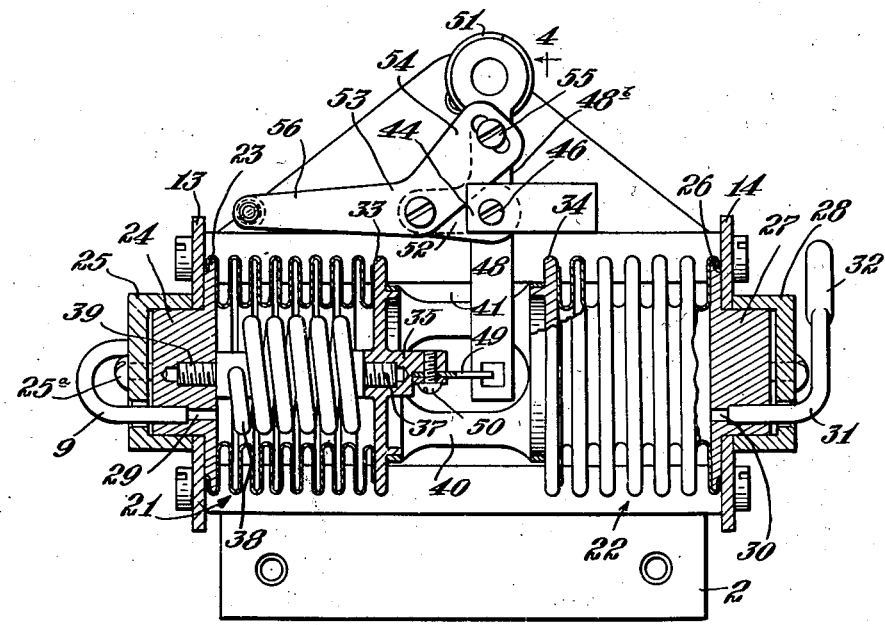
Fig. 3 is a front elevation of the parts shown in Fig. 2, omitting the dial, and with certain parts in vertical section.
Figure 4:
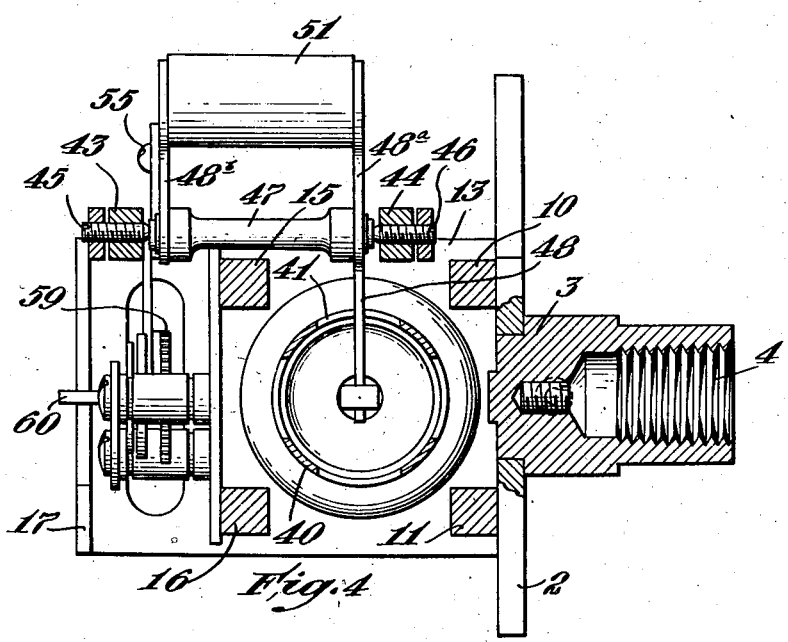
Fig. 4 is a vertical section substantially on the line 4—4 of Fig. 3.

Within the aforesaid space defined by the bars 10, 11, 15 and 16 there is arranged a pressure motor, here illustrated as comprising two pressure-responsive elements 21 and 22 (Figs. 2 and 3). These elements as here shown are flexible metallic bellows or diaphragms of generally cylindrical form and with their axes in alignment. The bellows or diaphragm 21 has the fixed head 23 (Fig. 3) provided with a central boss 24 which extends out through an opening in the plate 13 in which it fits snugly, the head 23 being clamped in position against the plate 13 by means of a cap 25, having openings for the reception of clamping screws 25ª which engage threaded bores in the boss 24. The head 26 of the bellows or diaphragm 22 is likewise provided with a central boss 27 which fits in an opening in the plate 14, the head 26 being clamped to the plate 14 by the cap 28.

The boss 24 of the head 23 is provided with a passage 29 leading to the interior of the bellows 21 and the end of the conduit 9 is secured leak-tight in a socket in the boss 24 with its interior canal 8 communicating with the passage 29.

The boss 27 of the head 26 is likewise provided with a passage 30 which communicates with the interior of the bellows 22, and a flexible conduit 31 has one end fixed in a socket in the boss 27 with its interior communicating with the passage 30 and has its opposite end sealed as indicated at 32, after completion of the instrument.

During manufacture of the instrument and assuming that bellows 22 is to be evacuated, the conduit 31 is connected to the air pump and when the desired vacuum has been obtained the conduit 31 is sealed, for example by welding at 32, thus preventing the entrance of atmospheric pressure into the bellows 22. On the other hand, if the bellows 22 is to be supplied with pressure fluid from a source of varying pressure, the conduit 31 will not be thus sealed but will lead to such source of varying pressure.

The bellows 21 has the movable head 33 and the bellows 22 has the movable head 34, the areas of the heads 33 and 34 which are exposed to pressure fluid being substantially equal, and the bellows are so arranged that were the internal pressure in either bellows to increase, its head would tend to move toward the head of the other bellows. The head 33 of the bellows 21 is provided with a central boss 35 (Fig. 3) having an axial, screw-threaded socket which receives a screw-threaded end 37 of a length of spring wire which is coiled to provide the helical tension spring 38. This spring is housed within the bellows 21 and is coaxial with the latter. The other end 39 of the wire which forms the spring is screw threaded and received in a screw-threaded axial socket in the boss 24 of the fixed head 23. As thus arranged the force exerted by this tension spring 38 is directed along the axis of the bellows 21 and is substantially devoid of any component tending to deflect the bellows.

The movable heads 33 and 34 of the two bellows devices are rigidly connected by the sleeve member 40 which may be secured to the bellows heads in any desired manner, for example by screw threading, welding or the like. This sleeve is provided with an elongate longitudinal slot 41 (Figs. 3 and 4) at its upper part for a purpose hereinafter described, and is preferably provided with other slots symmetrical with the slot 41 in order to decrease its weight and to avoid unbalancing the parts.

A bridge member 42 (Fig. 2) is secured to the bars 10 and 15. This bridge member is provided with a pair of spaced lateral brackets 43 and 44 (Figs. 2 and 4) (preferably split) having internally screw-threaded coaxial bores for the reception of the pintle screws 45 and 46 (Fig. 4), respectively. These pintle screws have pointed or substantially conical inner ends which are received in conical sockets in the opposite ends of a rock shaft 47. By turning the screws 45 and 46 the rock shaft 47 may be accurately adjusted lengthwise. By properly setting the screws 45 and 46 substantially all longitudinal and transverse motion may be eliminated, thus restricting the motion of the shaft to a pure rocking movement.

The rock shaft 47 is provided at one end with a rigid crank arm 48 (Fig. 4) which extends down through the slot 41 in the upper part of the sleeve 40 and which has its lower end disposed transversely of the aligned axes of the bellows devices 21 and 22.

A short link of flexible metallic ribbon 49 (Fig. 3) has one end fixedly secured to the lower part of the arm 48 and its other end fixedly attached, by means of a screw 50, to the boss 35 of the movable head 33 of the bellows 21. This flexible link 49 is preferably arranged in the horizontal plane of the axis of the bellows 21. Since this link is rigidly secured at one end to the arm 48 and at the other to the boss 35, all lost motion between the parts 35 and 48 is eliminated, although the flexibility of the link permits the arm 48 to swing in an arc about the axis of the shaft 47 without substantially deflecting the head 33 of the bellows from its normal vertical plane. Were there any lost motion at this point such as would result from the use of joints in the connections between the parts 35 and 48, it would be necessary to bias the parts always in one direction to take up such lost motion, as for example by the use of a loading spring. However, in certain positions of the instrument, the force imposed by the counterweight is considerable and when subjected to vibration the inertia forces exerted are even greater. Thus to provide a biasing load which would be dependable under all conditions, the spring would necessarily be so strong that the device would be inoperative due to the friction developed at the bearings. The jointless flexible link here employed completely eliminates lost motion, and thus makes it unnecessary to employ a loading spring of any kind.

The arm 48 is extended across the axis of the shaft 47 to form the second arm 48ᵃ (Figs. 3 and 4) and at the opposite end of the shaft 47 there is provided a parallel crank arm 48ᵇ rigidly secured to the shaft and together with the arm 48ᵃ rigidly supporting a counterbalance weight 51 disposed eccentrically with respect to the axis of the shaft 47.

The crank arm 48ᵇ is provided with a lateral integral offset 52 (Figs. 2 and 3) and to this offset is pivotally secured a lever 53 (Fig. 3) having an arm 54 which is provided with an arcuate slot which receives a set screw 55 engaging a thread opening in the arm 48ᵇ, thus permitting the lever 53 to be angularly adjusted with respect to the arm 48ᵃ.

The lever 53 also has an arm 56 which is connected by means of a link 57 to the tailpiece 58 (Fig. 1) of the sector lever 59 of a conventional gauge movement mechanism which turns the index staff 60 upon which the index or pointer 20 is mounted. The adjustability of the lever 56 with respect to the arm 48ᵇ permits movement of the sector lever for calibration purposes.

Assuming that the bellows device 22 has been evacuated during the process of making the instrument and that the socket 4 is connected with the manifold of the engine the operation is substantially as follows: Since the bellows 22 is evacuated the spring 38 will always be under tension except in such rare case as when the bellows 21 might be under absolute zero pressure. Any increase above zero pressure in the bellows 21 causes the bellows heads 33 and 34, together with the spacer sleeve 40, to move toward the right, and since the two bellows devices have equal effective areas, the barometric pressure acting upon the outside surface of the bellows devices is balanced and thus variations in atmospheric pressure have no effect on the action of the instrument. Any movement of the bellows head 33 to right or left is transmitted by the link 49 to the lever arm 48, thus turning the rock shaft 47 and thereby moving the arm 56 and causing the pointer to move along the scale on the dial.

Preferably, the initial setting of the parts is such that the arm 48 is substantially vertical when the pointer 20 is at the midportion of the graduated scale. Thus for example if the scale be graduated to read from ten to fifty absolute, as indicated in Fig. 1, then when the pointer is at the graduation thirty, the lever arm 48 will be substantially vertical. Thus the movement of this arm from this midportion will make equal angles as the pointer moves either up or down on the scale toward one limit or the other and thus any error due to angularity of the movement of the arm 48 is minimized. Since the flexible link 49 eliminates lost motion between the boss 35 and the arm 48, the possibility of inaccuracy at this point such as might be caused by the use of pivots is eliminated. Furthermore the employment of a tension spring substantially eliminates the tendency of the spring force to tilt the bellows, which is a common occurrence when compression springs are employed in connection with such bellows. The tilting of a bellows of this type not only decreases accuracy of operation but is also very injurious to the bellows themselves. By the employment of the tension spring so arranged as to exert its force in a direction which is accurately axial of the bellows, substantially all tilting of the bellows is eliminated and any such very slight tilting as may occur is averaged. Moreover, this way of applying the spring force insures the maximum force for overcoming the friction in the rock shaft and other parts and thus decreases such tendency to tilt the bellows as may result from an overloading of the parts by reason of excessive friction.

The mass of the counterweight 51 is substantially equal to the effective mass of the bellows, bellows heads, spacer sleeve, spring and other moving parts, and this weight 51 is so placed as substantially to balance all inertia forces which may act along the longitudinal axis of the bellows by reason of aircraft vibration. The instrument is thus dynamically balanced. Moreover, by the provision of this weight, the apparatus is also substantially statically balanced thus eliminating positional error of the instrument.

In accordance with the present invention, the spring 38 is preferably made of a material having a substantially zero temperature coefficient of modulus. Springs having this characteristic are commercially available and are understood to consist of an alloy containing approximately 36% nickel, 8% or more chromium, and 4% of other elements, including manganese, silicon, molybdenum, copper and vanadium, the remainder of the alloy being iron. The employment of such a spring eliminates most of the temperature errors arising from variation in spring modulus, and although there still remains a slight error due to change in the elastic modulus of the bellows, this error is so slight as to be substantially negligible.

Figure 5:
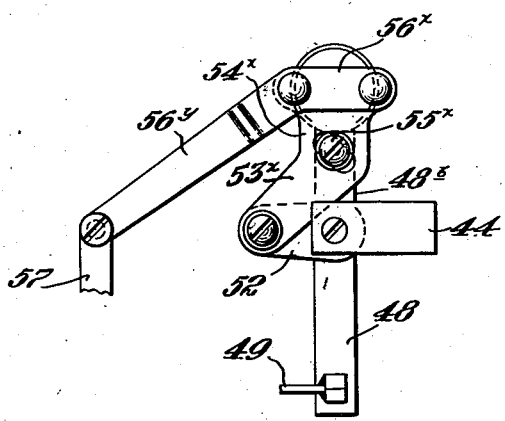
Fig. 5 is a fragmentary front elevation illustrating a modified and preferred form of motion-transmitting means designed to compensate for differential expansion of the parts.
Figure 6:
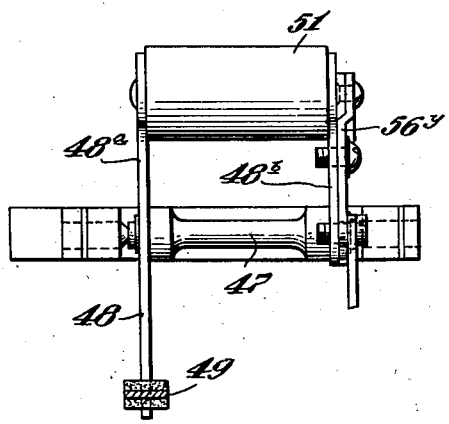
Fig. 6 is an elevation of the parts shown in Fig. 5, viewed from the left-hand side of the latter, with certain parts in vertical section.

However, the employment of a spring having a zero temperature coefficient introduces another difficulty from the fact that the length of the spring is substantially constant as respects temperature changes, whereas other parts, in particular the frame of the instrument, which is usually of brass or similar metal, has a substantial coefficient of thermal expansion. In accordance with the present invention, and in particular as illustrated in Figs. 5 and 6, the resultant error is substantially eliminated. As shown in Figs. 5 and 6, the rock shaft 47 is provided as in the previously described embodiment, with the downwardly directed crank arm 48 rigidly secured at its upper end to the shaft and having its lower end rigidly connected to one end of the flexible link 49. The parts 48ª, 48ᵇ, 51 and 52 are substantially identical with the correspondingly numbered parts illustrated in Figs. 1 to 4, inclusive, except that the part 48ᵇ, 52 is made of a material which has a substantially zero thermal coefficient of expansion. Such a material, commonly known under the trade name "Invar," is a commercial product readily available.

A lever 53ˣ is pivotally secured at its lower end to the outer end of the member 52, the lever 53ˣ being shown as inclining upwardly and having a substantially vertical upper end portion 54ˣ, the lever having an elongate slot which receives a set screw 55ˣ, thus permitting the lever 53ˣ to be swung about its pivotal connection to the part 52 and to be fixed in adjusted position, such adjustment being desirable to facilitate calibration of the instrument.

To the upper end of the lever arm 54ˣ is rigidly secured a member 56ˣ having a downwardly sloping elongate arm 56ʸ, the parts 56ˣ and 56ʸ being of brass or other material having a substantial coefficient of thermal expansion, while the lever 53ˣ, like the part 52, is of a material having a substantially zero thermal coefficient of expansion.

With this arrangement, in which the part 56ˣ, 56ʸ is supported above the axis of the shaft 47 at a distance which is substantially invariable as respects temperature variations, the free end of the arm 56ʸ, to which the link 57 is secured, has a slight but definite vertical movement in response to temperature variations. The parts are so dimensioned and designed that this slight vertical movement of the end of the arm 56ʸ accurately compensates for any such slight rocking of the rock shaft 47 as may result from the differential thermal expansion of the frame and the spring 38. Since the index receives its motion through appropriate connections from the free end of arm 56ʸ, such compensation is sufficient substantially to prevent any movement of the index as a result of temperature variations to which the instrument may be subjected during use.

Such terms as "horizontal," "vertical," "front" and "rear" have been employed for convenience in description, but it is to be understood that these terms are not to be regarded as limiting, since the instrument may be installed in any desired position and since in use on an airplane it is obvious that it may be tilted to various angles and will not always occupy the same position with respect to the surface of the earth.

While herein the pressure-responsive elements have been specifically illustrated as flexible metallic bellows, it is to be understood that other equivalent devices, for example Bourdon tubes or ordinary diaphragms may be arranged in a generally similar way to accomplish similar results. It is also to be understood, as above suggested, that this instrument or one having the same general characteristics may be employed for indicating differential pressures, in which case both diaphragms or bellows devices will be subjected to varying internal pressures. In this, as in the arrangement more specifically described above, the movement of the lever 48 is in response to the algebraic sum of the oppositely directed pressure forces acting upon the inner sides of heads 23 and 26.

It is to be understood that the invention is not necessarily limited to the precise arrangement of parts herein disclosed but that other arrangements such as above suggested or otherwise and which fall within the scope of the appended claims are to be regarded as within the purview of the invention.

I claim:

1. A pressure-responsive instrument of the class described comprising a movable index, pressure motor means including a hollow metallic bellows having a movable head and connections for transmitting motion from the head to the index, said connections including a rock shaft, motion-transmitting means actuated by the head and operative to rock the shaft, a tension spring housed within said bellows and arranged to exert force axially of the bellows in opposition to the force exerted by increasing fluid pressure within the bellows, the spring being of a material having a substantially zero temperature coefficient of modulus, the connections for transmitting motion from the movable head to the index including a composite crank including a part which is normally rigidly secured to and which extends upwardly from the rock shaft, and an elongate arm rigidly secured to the free end of said upwardly extending part and which inclines downwardly toward its free end, said upwardly extending part being of a material which has a substantially zero coefficient of expansion and the elongate part having a substantial coefficient of expansion, the parts being so designed and arranged that the position of the free end of said elongate arm in space is substantially unchanged by differential expansion of the spring and the other parts of the instrument due to temperature changes.

2. An instrument of the class described comprising a movable index, a pressure motor for actuating the index, and connections between the motor and index including a rock shaft which is rocked by the motor, a crank arm rigidly fixed to the rock shaft, and an elongate arm which is normally fixed to but which is adjustable with reference to said crank arm, said crank arm being of a material having a substantially zero coefficient of expansion, and the adjustable arm being of a material having a substantial coefficient of expansion, the parts being so designed and arranged that the position in space of the free end of said elongate arm is not substantially changed by differential expansion of the instrument parts in response to temperature changes.

3. In an instrument of the class described, two axially aligned, flexible, metallic bellows each having a movable head, the heads being spaced apart and of substantially equal effective area and being so arranged that they would move in opposite directions in response to increase in internal pressure within the respective bellows, one of said bellows being evacuated and permanently sealed, means operative to admit pressure fluid to the other bellows, a tension spring within the latter bellows arranged to oppose movement of its head in response to increasing internal pressure, a rigid sleeve connecting said movable heads, said sleeve having an elongate slot in its wall, a rock shaft having its axis in a plane perpendicular to the axes of the bellows, the axis of the rock shaft being spaced from the bellows axes and outside of the sleeve, a crank arm fixed to said rock shaft, the free end portion of said crank arm entering the connecting sleeve through the slot in the latter, said crank arm being substantially perpendicular to the bellows axes when the index is at the mid-point of its path of movement, an index, a stiffly flexible link substantially aligned with the bellows axes, one end of the link being rigidly secured to one of said movable heads and its opposite end being rigidly secured to the crank arm, and means operative to transmit motion from the crank arm to the index.

4. In an instrument of the class described, a rigid frame, two flexible bellows devices each having a fixed head and a movable head, one of said bellows devices being evacuated and permanently sealed, and means operative to admit fluid at varying pressure to the other bellows device, means securing the fixed heads to the frame with the axes of the bellows devices in alignment and with the movable heads spaced apart and opposed to each other, a rigid sleeve coaxial with and uniting said movable heads, said sleeve having an elongate slot in its wall, the frame having aligned internally screw-threaded bores in which adjustable pintles are mounted, a rock shaft having sockets in its opposite ends which receive the respective pintles, the axis of the rock shaft being in a plane which is perpendicular to the axes of the bellows devices and being spaced from the latter, a crank arm fixed to the shaft, the free end portion of said crank arm entering the sleeve through the slot in the latter, flexible jointless connecting means uniting the movable head of one of said bellows devices to the crank arm, a tension spring housed within that bellows device to which fluid at varying pressure is admitted, said spring being arranged to oppose movement of said head in response to increasing internal pressure within said latter bellows device, a motion-transmitting lever having one arm thereof adjustably connected to said rock shaft, an index, and means for transmitting movement of said latter lever to the index.

5. In an instrument of the class described wherein an index is movable over a graduated dial by motor means comprising two axially aligned flexible metallic bellows having their axes aligned and normally substantially horizontal, each bellows having a movable head, the bellows being so arranged that the movable heads would move in opposite directions in response to increase in internal pressure in the respective bellows, one of said bellows being evacuated and permanently sealed, and means operative to admit fluid at varying pressures to the other bellows, rigid means connecting said movable heads, a tension spring disposed within that one of said bellows to which pressure fluid at varying pressures is admitted, said spring being arranged to act axially of said latter bellows to oppose movement of its movable head in response to increase in internal pressure in the bellows, a lever supported to rock about an axis substantially perpendicular to the vertical plane of the bellows axes and spaced from the horizontal plane of the bellows axes, said lever being substantially vertical when the index is at substantially the mid-point of its travel, means connecting the free end of the lever to one of the movable bellows heads, means for transmitting motion from the lever to the index, the lever comprising a rigid arm extending upwardly above its pivotal axis and a counter-weight mounted upon said latter arm said counter-weight being of such mass as substantially to balance all of the other moving parts of the instrument both statically and dynamically.

6. In an instrument of the class described, a movable index, a pressure motor having a movable part, and a spring which constantly urges said part in one direction, said spring being so constructed and arranged as to have a substantially zero temperature coefficient of modulus, and means for transmitting motion from said movable motor part to the index, said motion-transmitting means comprising a lever, a flexible link rigidly secured at one end to said movable motor part and at its other to the free end of said lever, said lever having a rigid arm extending to the opposite side of its pivotal axis, said arm having a lateral offset portion, a motion-transmitting lever pivotally supported on said offset portion, means for retaining said motion-transmitting lever in adjusted angular relation to said offset portion, said offset portion being of a material having a substantially zero coefficient of temperature expansion, and the motion-transmitting lever being of a metal having a substantial coefficient of thermal expansion, and means connecting the motion-transmitting lever to the index.

7. A pressure-responsive instrument of the class described comprising a movable index, a pressure motor including a flexible metallic bellows having a movable head and connections for transmitting motion from said head to the index, said connections comprising a rock-shaft, motion-transmitting means actuated by the head and operative to exert force along the axis of the bellows thereby to rock the shaft, a tension spring arranged to exert force along the axis of the bellows so as to oppose motion of its movable head in response to increase in internal pressure within the bellows, the spring being so constructed and arranged as to have a substantially zero temperature coefficient of modulus, the connections for transmitting motion from the bellows head to the index including a lever fixed to the rock-shaft, said lever having oppositely extending arms to one of which the motion of the bellows head is transmitted thereby to rock the rock shaft, the other of said lever arms having a lateral offset consisting of a material having a substantially zero coefficient of thermal expansion, a motion-transmitting lever mounted on said offset, said motion-transmitting lever being of a material having a substantial coefficient of thermal expansion, means for adjustably fixing said motion-transmitting lever relatively to said offset, and means for transmitting motion from said motion-transmitting lever to the index.

8. In an instrument of the class described wherein an index is movable over a graduated dial by motor means comprising two axially aligned flexible metallic bellows having their axes aligned and normally substantially horizontal, each bellows having a movable head, the bellows being so arranged that the movable heads would move in opposite directions in response to increase in internal pressure in the respective bellows, one of said bellows being evacuated and permanently sealed, and means operative to admit fluid at varying pressures to the other bellows, rigid means connecting said movable heads, a tension spring disposed within that one of said bellows to which pressure fluid at varying pressures is admitted, said spring being arranged to act axially of said latter bellows to oppose movement of its movable head in response to increase in internal pressure in the bellows, a rock shaft whose axis is substantially perpendicular to the vertical plane of the bellows axis and spaced from the horizontal plane of the bellows axis, conically ended pintles engaging conical sockets in the opposite ends, respectively, of the rock shaft and constituting rigid supports for the shaft permitting the latter to turn freely but minimizing all other motion of the shaft, a rigid arm fixed to the rock shaft, the free end of the arm being adjacent to the axis of the bellows, a flexible link rigidly secured at one end to said arm and rigidly connected at its opposite end to one of the bellows heads, and a counterweight spaced from and rigidly connected to the rock shaft, said counterweight being of such mass and so spaced from the axis of the rock shaft as substantially to balance the bellows assembly both statically and dynamically.

JOHN W. ROBINS.